Patented Jan. 9, 1934

1,943,019

UNITED STATES PATENT OFFICE 1,943,019

PREPARATION OF FROZEN MEAT AND THE LIKE

Grover Ralph Henney and Charles Taylor Walter, Chicago, Ill., assignors to Swift and Company, Chicago, Ill., a corporation of Illinois No Drawing. Application January 27, 1931
Serial No. 511,644

5 Claims. (Cl. 99—14)

Our invention relates to methods for producing marketable packages of comminuted food products, such as the type of ground beef commonly called hamburger steak.

One of the objects of our invention is to provide an economical method for producing such products under factory conditions. Another object of our invention is to produce a merchantable package of good appearance without the addition of adulterants to agglomerate the mass.

Other objects of our invention will be apparent from the description which follows.

The public demand for packaged food products could not heretofore be satisfied in the case of uncooked comminuted perishable food products, such as hamburger steak, for instance, which is ground beef, principally because no preservative is desired in connection with this product.

Our invention contemplates furnishing the trade with such products as these in frozen form, which permits of the manufacture of merchantable packages of attractive appearance, and with ordinary refrigerating precautions, avoids danger of spoilage.

In the case of hamburger steak, we have found that the best results are obtained by first subjecting the pieces of beef to be comminuted to uniform temperature, between 26 degrees and 27 degrees Fahrenheit, at which temperature the product will be only semi-frozen. While in this condition we pass the product into a conventional worm and plate type grinding machine to reduce the product to the size and state suitable for hamburger meat. In this connection we have discovered that it is important to pass the product through the grinding machine rapidly so as to avoid heating of the product while grinding, due to the mechanical work to which it is subjected in the grinding machine. We accomplish this by equipping the grinder with powerful driving means. If small horsepower is used in grinding, and if an attempt is made to feed the grinding machine to capacity, the grinding machine will cease to operate under the load imposed by the semi-frozen product. If small horsepower is used and the grinding machine is charged at a slow enough rate to avoid clogging of the equipment, the amount of the product which can be put through the machine is so limited, and the time it remains in the machine is so long, that the product is unduly heated in the process. After proper grinding, in the manner we have outlined, the material is in a semi-frozen and dry condition and is subjected to very little mechanical pressure. While in this state it can be successfully formed into cakes which have sufficient mechanical strength to enable them to be wrapped and packaged subsequent to hard chilling at a temperature of zero degrees Fahrenheit or lower.

The cakes may be formed in molds by hand, or by manually or power operated presses.

In practice, we prepare the product as hereinbefore described, remove the semi-frozen cakes from the pressing device to trays, which are placed in a sharp freezing room carried at a temperature below zero degrees Fahrenheit to freeze the product solid and permit the necessary handling incident to wrapping, where it is desired to market the product in packaged form.

It is understood that changes may be made in the manner of producing the products heretofore discussed without departing from the spirit of our invention, as defined in the following claims:

We claim:

1. The method of producing a comminuted flesh food product consisting in, first, subjecting the product to temperatures below freezing until the product is reduced to a semi-frozen condition, comminuting while in such semi-frozen condition, and pressing a collection of the resulting comminuted semi-frozen products to a desired form.

2. The method of producing a comminuted flesh food product which consists in, first, subjecting the flesh food from which the comminuted flesh food product is to be made to temperatures below freezing until the flesh food is reduced to a semi-frozen condition, then comminuting the same, then pressing the semi-frozen comminuted flesh food to a predetermined form, and subsequently completely freezing the resulting comminuted flesh food product.

3. The method of producing an animal food product which consists in first tempering food to an equalized semi-frozen condition, subjecting to the action of a power grinding machine, and pressing the semi-frozen ground animal food product into a predetermined form and freezing solid.

4. The method of producing meat products which comprises, first, tempering meat to a uniform, semi-frozen temperature, then comminuting while semi-frozen at a rate of speed sufficiently high to avoid undue heating and so as to leave the comminuted product in said semi-frozen condition, and subsequently pressing the comminuted product to a predetermined form.

5. The method of producing a comminuted beef food product as hamburger steak which consists in, first, subjecting the beef from which the hamburger steak is to be made to temperatures approximately between 26 degrees F. and 27 degrees F. until the beef is reduced to a semi-frozen condition, subjecting said semi-frozen beef to grinding in a manner whereby there results comminuted beef still in semi-frozen condition and of a size suitable for the production therefrom of hamburger meat, then pressing the semi-frozen comminuted beef into a desired form, subsequently completely freezing the pressed and shaped comminuted beef which then constitutes the hamburger steak, and thereafter wrapping for the trade.

GROVER RALPH HENNEY.
CHARLES TAYLOR WALTER.